United States Patent [19]

Evans

[11] 3,888,676

[45] June 10, 1975

[54] SILVER HALIDE FILMS WITH WIDE EXPOSURE LATITUDE AND LOW GRADIENT

[75] Inventor: Warren William Evans, Highland Park, N.J.

[73] Assignee: E. I. du Pont de Nemours and Company, Wilmington, Del.

[22] Filed: Aug. 27, 1973

[21] Appl. No.: 391,525

[52] U.S. Cl. .............................. 96/68; 96/17; 96/67; 96/120
[51] Int. Cl. ........................... G03c 1/02; G03c 1/08
[58] Field of Search .......... 96/5, 44, 17, 68, 67, 120

[56] References Cited
UNITED STATES PATENTS

| | | | |
|---|---|---|---|
| 2,456,955 | 12/1948 | Knott et al. ................................ | 96/5 |
| 3,130,053 | 4/1964 | Hellmig et al. ........................... | 96/68 |
| 3,140,179 | 7/1964 | Russell .................................... | 96/68 |
| 3,206,313 | 9/1965 | Porter et al. ............................. | 96/68 |
| 3,396,024 | 8/1968 | Hellmig et al. .......................... | 96/69 |
| 3,418,123 | 12/1968 | Haugh ..................................... | 96/63 |
| 3,450,536 | 6/1969 | Wyckoff ................................... | 96/68 |
| 3,632,342 | 1/1972 | Salesin .................................... | 96/68 |

*Primary Examiner*—Norman G. Torchin
*Assistant Examiner*—Alfonso T. Suro Pico

[57] ABSTRACT

Photographic films with low gradients and wide exposure latitude are prepared from two emulsions, one being chemically and optically sensitized and the other being optically sensitized. The emulsions are mixed and coated or coated as two separate layers. These films are particularly useful as continuous tone masking films for making color corrections for color separation films used in, for example, the litho industry during the printing process.

9 Claims, No Drawings

SILVER HALIDE FILMS WITH WIDE EXPOSURE LATITUDE AND LOW GRADIENT

BACKGROUND OF THE INVENTION

1. Field of the Invention

This invention relates to silver halide elements especially those useful as photographic masks. More particularly, the invention relates to silver halide elements useful in the photomechanical masking of color separation films to correct color and tone balances used therein.

2. Description of the Prior Art:

The first step in preparing a printing plate for the multiple reproduction of a colored original involves the photographic recording of the original on so-called "color separation films." In this process, the original image is successively photographed three or more times, each time through a different color (red, green and blue) filter on a new piece of the color separation film. These films are then processed and separate printing plates made therefrom. The plate made from the red filter separation is used to print with cyan ink, the plate from the green filter separation is used to print with magenta ink, and that from the blue filter separation is used to print with yellow ink. When a four-color printing is made, a black filter separation is also made and used to print with black ink. However, the inks used to print from the printing plates made as described above are normally deficient both in their reflection and absorption characteristics. The yellow inks reflect some blue light, the magenta inks reflect some green light and the cyan reflects some red light. Ideally, all the inks should absorb 100% of the reflected light from their respective color. To correct for these inherent deficiencies, masks are used during the preparation of the color separation element. These masks are photographic silver halide elements used in conjunction with the proper color filter to prepare the color separation negatives. These masks subtract optical density from the negatives used to prepare the final printing plate which subsequently results in addition of optical density to the printed image. For example, density is added to cyan and magenta wherever yellow is present to correct for yellow, to cyan and yellow wherever magenta is present to correct for magenta, and to yellow and magenta wherever cyan is present to correct for cyan. Thus, three or four masks are usually necessary, one for each color separation negative, to achieve the proper color and tone balance in the final, printed image.

The plates prepared from the masked color separation elements are used, for example, in offset lithography as taught by Jaffe et al., in *Color Separation Photography*, Graphic Arts Technical Foundation, Inc., August 1959. Preparation of the masked photographic copy, conversion of the color negative image to the color printer plate, and associated systems, are fully described therein. Other processes which use color separation film are letterpress gravure printing and stencil or screen printing as described by Yule in *Principles of Color Reproduction*, John Wiley and Sons (1967).

It is highly desirable that photographic elements useful in preparing these masks described above possess a wide exposure latitude. By wide exposure latitude, it is meant that the straight-line portion of the exposure curve extends over a long area of exposure without a shoulder. The gamma or gradient of these elements should also be fairly low, that is, they should produce only a small, incremental density increase as the exposure is increased. The exposure curve is a plot of the log of exposure v. the density of the developed image. If the slope of the curve is low (low gradient) and the straight line portion of the curve extends over a wide exposure range without shouldering off (wide exposure latitude), a contrast difference will not be extreme over a range of exposures, and development time does not have to be adjusted. Most films used for preparing color correction masks do not inherently possess these features of exposure latitude and gradient and the operator must correct for these deficiencies by simultaneously varying the exposure and developing conditions, i.e., reducing the time of development of the exposed photographic element. When hand processing in trays and the like are employed, reducing the developing time is not considered to be a severe problem. However, the printing industry is converting mainly to machine processing of film. Reducing the time of the developing cycle of an automatic film processing unit is a very difficult step to reproduce accurately and is additionally time consuming. Thus it is desirable to be able to process the mask elements under conditions similar to those used for any other element used in the system without adjustment.

It is known from British Patent specifications 428,305, May 10, 1935, and 732,691, June 29, 1955, that the physical characteristics of a sensitometric curve produced from a step-wise image exposure of photographic element can be adjusted by preparing the element from a mixture of two or more silver halide emulsions. Normally, these emulsions result from silver halide grains of different sizes prepared, for example, by employing different Ostwald ripening conditions during that period of the manufacturing process known as "precipitation." A fine grain emulsion will normally produce a photographic element with slower speeds but with higher contrasts than one containing larger silver halide grains. When emulsions containing fine grains are mixed with emulsions containing larger grains, as taught in the above references, it is sometimes possible to adjust the amounts of each so mixed so that the resulting sensitometric curve produced from a stepwise image exposure of this product has speed and contrast intermediate to the sensitometric curves produced by the individual emulsions. However, these mixtures invariably tend to "shoulder" rapidly in the sensitometric curve which reduces the exposure latitude. Additionally, since these emulsions owe their grain size distribution to the effect of the Ostwald ripening process during the precipitation or "grain-forming" period of their manufacture, they are "different" emulsions and will exhibit different responses to sensitization parameters, especially to optical sensitizers. Since the masking films are normally optically sensitized over the entire visible region, i.e., panchromatically sensitized, it would be very difficult to get a photographic element that responds in the desired manner, i.e., sensitometrically and spectrally, from a mixture of two differently precipitated silver halide emulsions.

Another disadvantage of mixing emulsions of different grain size distribution lies in the diffisulty of accurately sensitizing each portion so that the resulting mixture will have the proper sensitometric response. Elements useful as masks in preparing separation films must have adequate exposure speed and yet the highest density produced must also be low. Additionally, these films must have wide exposure latitude plus low contrast. It would be exceedingly difficult to mix varied grain size emulsions so as to achieve this delicate balance. It has been found that the proper balances can only be achieved when one prepares emulsions of the desired inherent grain size distribution, sensitive in the same manner to the optical sensitizers that must be used and then uses chemical sensitization to achieve the proper speed balance according to this invention.

SUMMARY OF THE INVENTION

It is an object of this invention to provide a black and white silver halide element which will produce a low gradient and have a wide exposure latitude under normal conditions of machine processing useful in preparing, for example, masks for the preparation of color separation negatives. A further object is to produce such an element from emulsions with the same silver halide grain size distribution with little or no change in sensitometry (i.e., response to optical sensitization). Yet a further object is to provide a color correction masking system from these elements which requires only two masks, prepared under equal development conditions, to produce satisfactory color and tone corrections.

These and other objects are achieved by a photographic element prepared from two silver halide emulsions, one of which emulsions has a lesser degree of chemical sensitization than the other and both of which are optically sensitized in the same spectral region. The element is conveniently made by dividing a single emulsion into two portions, chemically and optically sensitizing one portion, while optically sensitizing the other portion, and then recombining the two portions and coating them as a single layer or by coating them as separate and preferably continguous layers.

DESCRIPTION OF THE PREFERRED EMBODIMENTS

The photographic elements of the invention are preferably made by separating an emulsion into two portions, chemically and optically sensitizing one portion and optically sensitizing the other portion, and then recombining and coating or coating separately the two portions. By adjusting the amount of each portion used the desired contrast and exposure latitude can be achieved under normal machine processing conditions. Since the grain size distribution is the same in both portions of emulsion an early shouldering can be avoided if the emulsion selected does itself not produce an early shoulder. Thus a wide exposure latitude can be achieved. By having a portion with reduced chemical sensitization, a low gradient can be achieved and the gradient and latitude can be controlled over a wide range by the simple steps of the degree of sensitization and/or amount of mixing of the two portions. While the photographic element of the invention has been described as comprising two emulsions, it may of course contain additional emulsions or emulsion layers within the spirit of the invention. The more separate emulsions or layers employed, however, the more costly will be the preparation of such elements.

Emulsions for preparing films useful as masking elements are usually of the bromoiodide type, though in the practice of this invention any of the common silver halides (bromide, iodide, chloride) or mixtures thereof may be used. In a preferred embodiment a gelatino emulsion is prepared consisting of about 96 mole percent silver bromide and about 4 mole percent silver iodide. The conditions of precipitation and Ostwald ripening are selected so that the resulting emulsion will contain silver halide grains with an average size of preferably about one micron. After further dispersion of the emulsion with gelatin and/or other binding agents, the emulsion maybe split into two portions. Portion A is preferably brought to its optimum sensitivity with chemical sensitizers comprising gold and sulfur, and a panchromatic optical sensitizer while Portion B is preferably treated only with the same panchromatic optical sensitizer. When the after-ripening step is complete, both portions are cooled and the usual wetting aides, antifoggers and hardeners added thereto. The emulsions are then recombined in proportions depending upon the sensitometry desired, with the weight ratio of one emulsion to the other usually being no more than 10 to 1. For example, a blend of 4 parts A plus 6 parts B (i.e., a ratio of B/A=3/2) will yield an excellent panchromatic masking film particularly useful in preparing color separation negatives for the printing process. The emulsion prepared as described above may then be coated as a single layer on a suitable film support and is preferably overcoated with a thin protective supercoat of gelatin.

In another embodiment Portion B may be sensitized partially with chemical sensitizers so as to increase the gradient as desired or so as to balance the latitude with that of the fully sensitized Portion A. The photographic speed of Portion B (partially sensitized) should preferably be less than 12 percent of the speed of Portion A (fully sensitized).

In yet a further embodiment the two portions may be coated as separate layers to achieve the same result of low contrast and wide exposure latitude under normal processing conditions. Whether coated separately or recombined and coated, the emulsion will have the same silver halide grain size distribution if they are portions of the same original emulsion. By silver halide grain size distribution is meant the percentages of silver halide grains of various sizes in the emulsion. It is preferred that the silver halide grain size distributions of the emulsions from which elements of the invention are made be substantially the same.

In addition to wide exposure latitude and low gradient, films of the invention have excellent sensitometric characteristics such as good speed and low fog, and when the preferred elements are made and used in a preferred manner (i.e., as a masking element), can be produced with equal red and green gradients which allows one to use a two-mask system for preparation of the color separation films. Silver halide emulsions for use in the invention have a colloid binder such as gelatin. However, other binding agents (e.g. albumin, agar-agar, gum arabic, alginic acid, polyvinyl alcohol, polyvinyl pyrrolidone, cellulose ether, partially hydrolyzed cellulose acetate, alkyl acrylate polymers, or mixtures of two or more of those listed, etc.) may be used equally as well.

The emulsions used are advantageously chemically sensitized by well-known procedures such as by digesting in naturally active gelatins or by adding the sulfur compounds of U.S. Pat. Nos. 1,574,944; 1,623,499; and 2,410,699. The emulsion can also be treated with the salts and metals described in U.S. Pat. Nos. 2,399,083; 2,448,060; 2,597,856; and 2,597,915, as well as the reducing agents (e.g. stannous salts) of U.S. Pat. No. 2,487,850. Other chemical sensitizing agents are well known to those skilled in the art and may also be advantageously employed herein.

These emulsions may also contain any of the well-known optical sensitizers to produce the desired spectral response. Those described in Mees, *The Theory of the Photographic Process*, 3rd Edition (1967), Chapters 11 and 12, and others well known to those skilled in the art, will function. The sensitization conditions for the particular emulsion used are adjusted as necessary to achieve the speed and spectral response desired. Particularly preferred sensitizing dyes are those which respond to the entire visible spectrum known as panchromatic dyes. Panchromatic sensitization may be achieved by a single optical sensitizer or a mixture of two or more optical sensitizers and the film prepared therefrom will have a response to light from any wavelength of the visible spectrum. Panchromatic sensitization is particularly useful with photographic elements that are used as masking films during the color separation process.

After sensitization is complete other adjuvants (e.g. wetting and coating aids, hardeners, antifoggants, etc.) may then be added, and the emulsions are coated on a suitable film support (i.e., polyethylene terephthalate prepared and subbed as described in Alles U.S. Pat. No. 2,779,684, Example IV). They may be coated by any of the means disclosed in the prior art (i.e., skim, air-knife, bar or falling film coating techniques) on any suitable support including glass, cellulose acetate, cellulose nitrate and other synthetic film-forming resins or polymers (e.g. polyester, polyamides, polystyrene, etc.). The film elements may also contain anti-curling backing layers, and said backing layers may contain other adjuvants such as antistatic agents, etc.

In the following specific examples, the emulsions are of the ammonia-ripened variety. It will be understood that the sensitization (also called "digestion") step involves a treatment of the emulsion in the presence of gold and sulfur for a time and at a temperature necessary to give the desired photographic speed and fog level. The times and temperatures of sensitization treatments will vary with the emulsion type and are generally in the range of 30 to 60 minutes and 130°F to 160°F. At the end of the sensitization step, the emulsion is cooled to a temperature convenient for the addition of other ingredients, e.g. coating aids, hardeners, antifoggants etc. The emulsion is stirred and then held at or below the temperature of addition until coating. Where a portion is treated only with the optical sensitizer (i.e., dye), the emulsion is usually digested with the dye at an elevated temperature and for a period of time necessary to insure adequate dye distribution and adsorption.

The system of use of the elements described in the examples requires one piece of film to be exposed to green light for use as the yellow record mask and one piece of film to be exposed to red light as the magenta and cyan record mask. These films are then processed at equal development times and will achieve equal gradients. The masks so produced are then used in combination with the original subject to prepare the separation negatives therefrom.

This invention will now be illustrated by, but not limited to the following examples wherein a relative speed is calculated in relation to the exposure necessary to give a net density of 0.3, and gradients are measured as to the slope of a line between gross densities of 0.3 and 0.9.

EXAMPLE 1

A silver bromoiodide emulsion (96 mole percent bromide and 4 mole percent iodide) was precipitated, washed and redispersed in gelatin (220 gms. gelatin/1.5 moles of silver halide). The resulting dispersion was split into two portions. One portion (the chemically unsensitized portion) was digested with a panchromatic sensitizing dye at about 130°F for about 45–50 minutes. The dye (3,3'-disulfopropyl-9-methylthiacarbocyanine) was added as a solution of one gram of dye per liter of methanol solvent, in the amount of 170 ml of the dye solution per 1.5 moles silver halide. The emulsion was then cooled and the usual wetting agents, coating aids, hardeners and antifoggants were added thereto. The other portion (the chemically sensitized portion) was treated in a like manner except that gold and sulfur sensitizers (designed to achieve the full sensitivity of said emulsion) were added in addition to the same panchromatic sensitizing dye at the digestion step. The gold was added as 34 ml $K[Au(SCN)_2]$ solution per 1.5 moles silver halide, where the $K[Au(SCN)_2]$ solution is prepared from an aqueous mixture of 8.1g per liter KSCN and 92 mg per liter $AuCl_3$. The sulfur was added as 17 ml of sodium thiosulfate solution per 1.5 moles silver halide, said solution being an aqueous solution containing 500 mg sodium thiosulfate per liter. At the end of this period 6 parts of the unsensitized portion were thoroughly blended with 4 parts of the fully sensitized portion and the resulting mixture was coated in the usual manner on a polyethylene terephthalate film support, and a coating weight of about 80–85 mg of silver halide/$dm^2$ was achieved. A thin protective supercoat of gelatin and hardener was also coated thereon as well as a gelatin backing layer which was applied to the opposite side of the film base to that side bearing the silver halide layer. This backing layer was applied to reduce curling in the subsequent element. After drying, strips from this coating were given an approximately 15 second exposure through a $\sqrt{2}$ step wedge to a tungsten source at a distance of about 6 feet. Three samples of each film were exposed through a Wratten 47B filter, a Wratten 58 filter or a Wratten 25 filter, respectively, followed by machine processing in a Pako G-24 automatic processor containing a continuous tone mixed developer (metolhydroquinone). Processing time in the developer step was varied from ¾ to 3 minutes at about 80°F. The fixing, washing and drying steps were also varied to match the time in the developing step (i.e., at ¾ minute in the developer the sample would also be ¾ minute in the fixer plus ¾ minute in the washer plus ¾ minute in the drier for a total processing time of 3 minutes in the machine). The following results were obtained:

| Developer Processing Time (Min.) | Gradient Between 0.3 – 0.9 Gross Density | | | Base + Fog |
|---|---|---|---|---|
| | Red | Green | Blue | |
| ¾ | .37 | .37 | .29 | .07 |
| 2 | .51 | .51 | .37 | .06 |
| 3 | .57 | .56 | .43 | .05 |

As can be seen from these results, the gradients are extremely low. The films all had adequate speed and when an H&D sensitometric curve was plotted therefrom, it showed a wide exposure latitude, that is, no shouldering was produced in the region of exposure used herein. When these elements were used as masks to prepare color separation negatives excellent final results were obtained. In comparison, a similar element containing panchromatically sensitized emulsion with full chemical sensitization and no blending of an unsensitized portion required that the processing time be reduced to ½ minute to achieve a low gradient and additionally did not have the wide exposure latitude of the film described above in that the curve showed signs of shouldering at the higher regions of exposure. Therefore, satisfactory masking elements could not be made from the prior art element.

EXAMPLE 2

An emulsion similar to that described in Example 1 was prepared, redispersed and split into two portions. One portion (the unsensitzed portion) was treated only with a panchromatic sensitizing dye while the second portion (the sensitized portion) was brought to its optimum sensitivity with gold and sulfur plus treatment with the same panchromatic sensitizing dye. Two coatings were prepared. Coating A was made from a mixture of 6 parts of unsensitized plus 4 parts of sensitized while Coating B was made entirely from the sensitized portion. Both coatings were approximately the same coating weight (e.g. about 74 mg. silver halide/dm$^2$) and were overcoated, backed and dried as described in Example 1. Samples from each coating were exposed and processed as described therein with the following results:

| Sample | Dev. Time (Min.) | Speed | | | Gradient | | | Base + Fog |
|---|---|---|---|---|---|---|---|---|
| | | Red | Green | Blue | Red | Green | Blue | |
| Coating A (mixed emulsions) | ¾ | 66 | 67 | 61 | .39 | .39 | .31 | .04 |
| | 2 | 75 | 76 | 71 | .55 | .53 | .42 | .06 |
| | 3 | 78 | 81 | 77 | .62 | .61 | .42 | .06 |
| Coatings B (single emulsions) | ¾ | 87 | 86 | 86 | .64 | .65 | .49 | .06 |
| | 2 | 97 | 96 | 97 | .79 | .79 | .61 | .08 |
| | 3 | 100 | 100 | 100 | .84 | .83 | .68 | .09 |

In addition to having the desirable low gradient the films from Coating A had wider exposure latitude than those from Coating B and made excellent masks for color separation films.

These examples were repeated with a number of panchromatic optical sensitizers, different emulsions and sensitization conditions. In each case one was able to achieve a lower gradient and a wider exposure latitude.

All of the above elements of this invention were processable at reasonable times in the same machines commonly used in the industry and produced excellent results when so processed and used as masking elements. These elements needed only two masks for producing excellent separation films as judged by a visual inspection of the color and tone of a final printed copy made therefrom. All the colors and tone were equal to or better than controls employing 3 or 4 masks of other films which shouldered and which had to be produced by varying the exposing and processing conditions.

I claim:

1. A photographic element comprising two silver halide emulsions separately coated or mixed and coated on a film support, one of said emulsions having a lesser degree of chemical sensitization than the other, and both of said emulsions being optically sensitized in the same spectral region.

2. A photographic element according to claim 1 wherein said emulsions have the same silver halide grain size distribution.

3. A photographic element according to claim 1 wherein said emulsions are optically sensitized with a panchromatic sensitizing dye.

4. A photographic element according to claim 1 wherein said emulsions are gelatino silver bromoiodide emulsions containing about 96 mole percent silver bromide and about 4 mole percent silver iodide.

5. A photographic element according to claim 4 wherein the weight ratio of the emulsion having lesser chemical sensitization to the fully chemically sensitized emulsion is about 3/2.

6. A panchromatic masking film useful in preparing color separation negatives comprising a photographic element according to claim 5, said emulsions having the same silver halide grain size distribution and being optically sensitized with a panchromatic sensitizing dye.

7. A method of making a photographic element with wide exposure latitude and low gradient comprising (a) dividing a single silver halide emulsion into two portions, (b) chemically and optically sensitizing one portion while optically sensitizing the other portion, and then (c) recombining the portions and coating them as a single layer on a film support or coating them as separate layers.

8. A method according to claim 7, wherein the optically sensitized portion is partially chemically sensitized while the other portion is fully chemically sensitized.

9. A method according to claim 7, wherein the portions are coated as two separate, contiguous layers.

* * * * *